O. WAGNER.
PIPE SEVERING DEVICE.
APPLICATION FILED JUNE 15, 1912.
1,097,152.
Patented May 19, 1914.
3 SHEETS—SHEET 2.
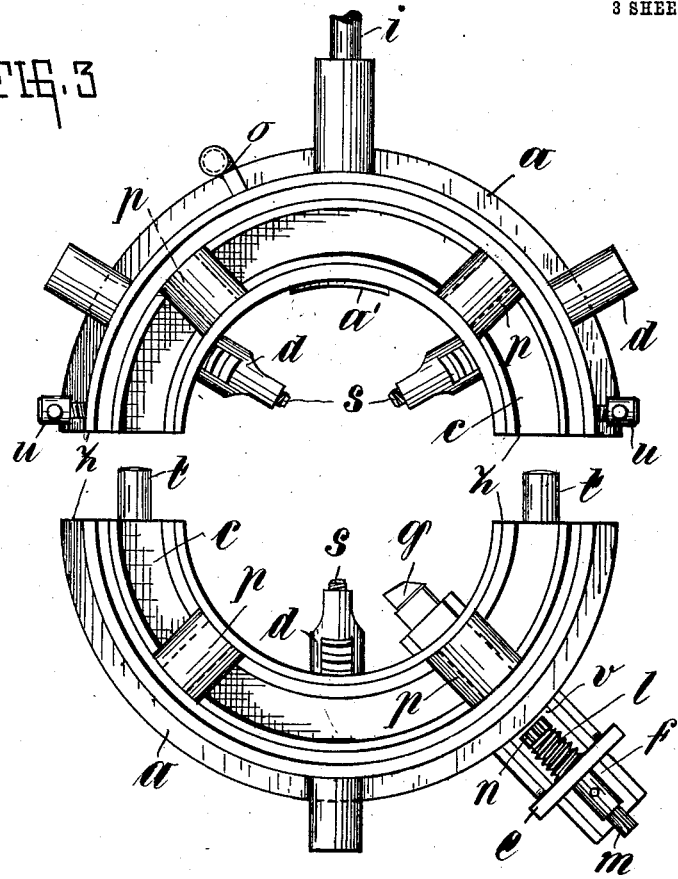
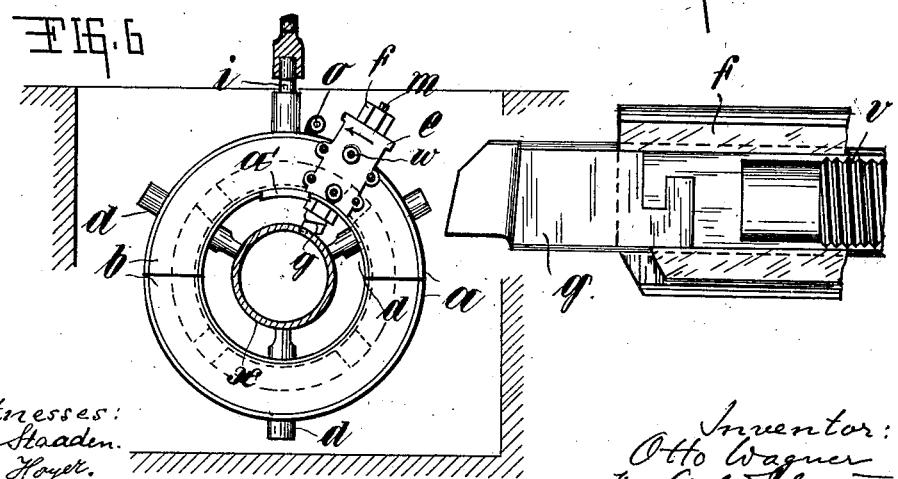

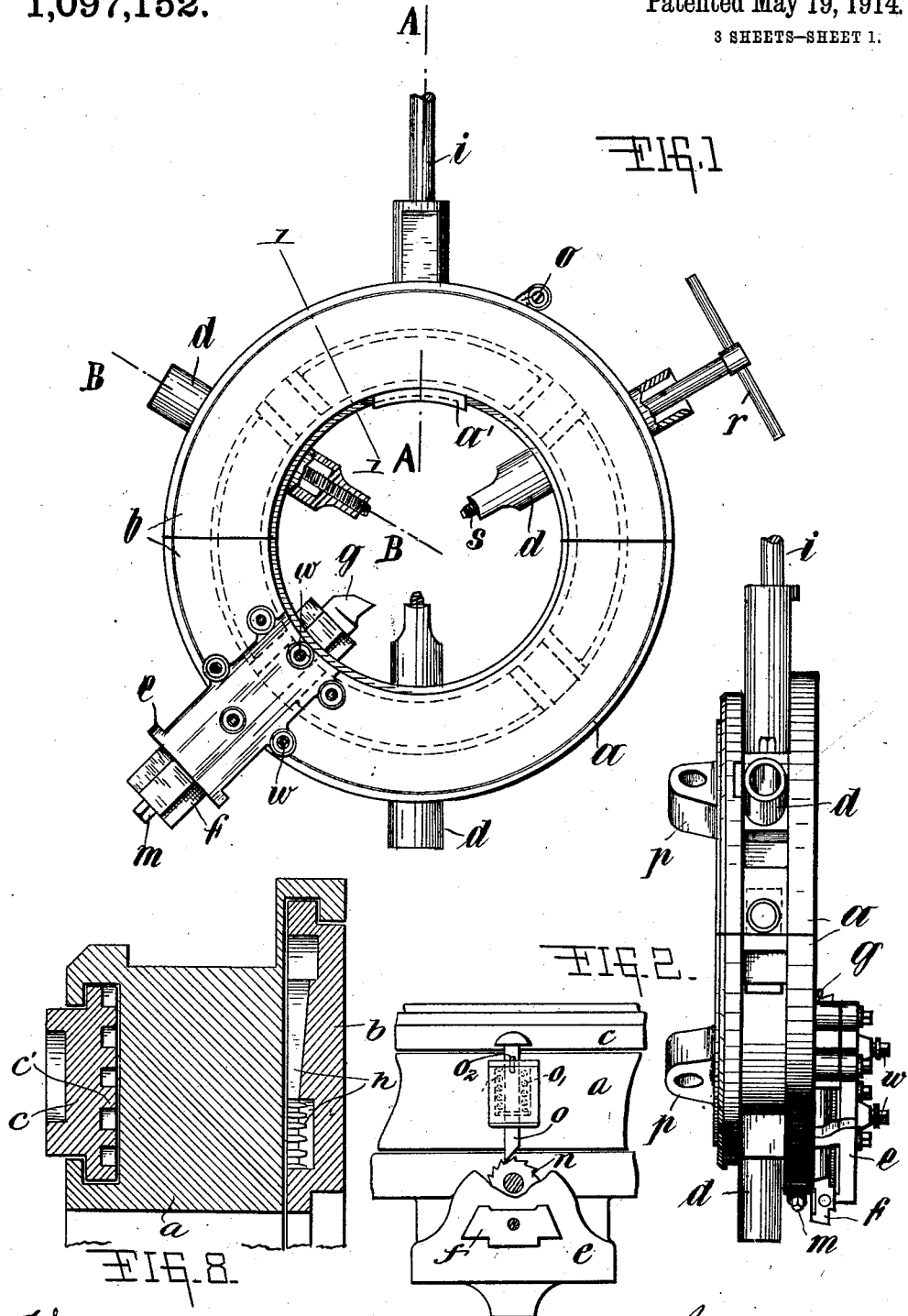

O. WAGNER.
PIPE SEVERING DEVICE.
APPLICATION FILED JUNE 15, 1912.
1,097,152.
Patented May 19, 1914.
3 SHEETS—SHEET 3.
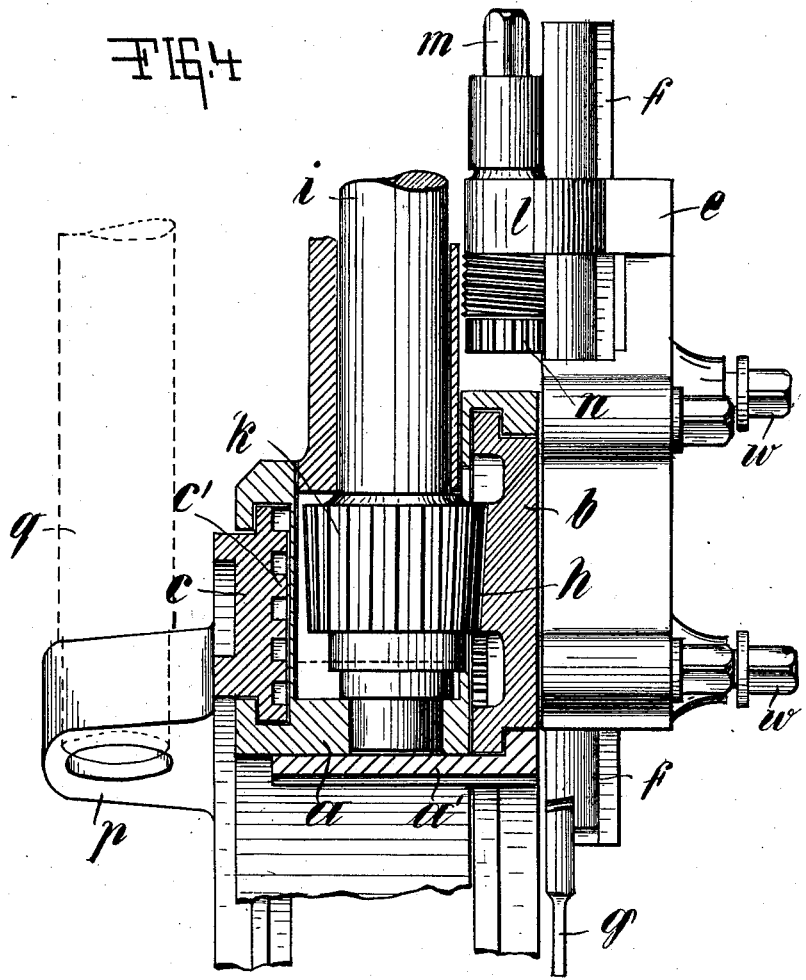
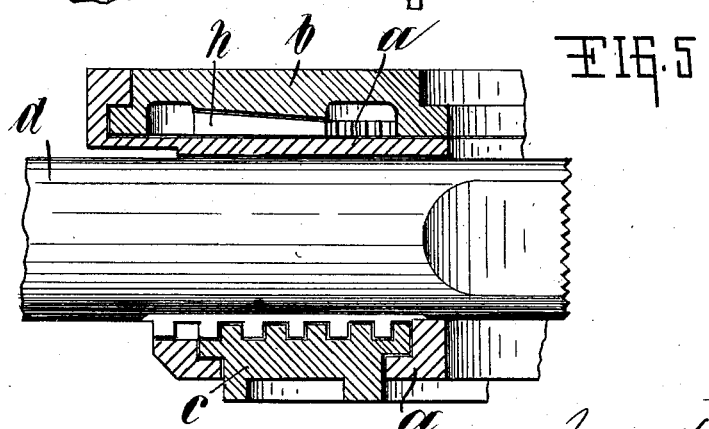

UNITED STATES PATENT OFFICE.

OTTO WAGNER, OF RONNEBURG, GERMANY, ASSIGNOR TO WALTER KRETZSCHMAR, OF GERA-UNTERMHAUS, GERMANY.

PIPE-SEVERING DEVICE.

1,097,152. Specification of Letters Patent. Patented May 19, 1914.

Application filed June 15, 1912. Serial No. 703,791.

*To all whom it may concern:*

Be it known that I, OTTO WAGNER, a subject of the Sovereign of Reuss, residing at Ronneburg, in the Dukedom of Saxe-Altenburg and German Empire, have invented certain new and useful Improvements in and Relating to Pipe-Severing Devices, of which the following is a specification.

My invention relates to pipe cutters.

My improved pipe cutter can be advantageously used for pipes which are placed in a trench or excavation and therefore not easily accessible.

My new pipe cutter is made in two parts and is so constructed and arranged that, after each complete rotation, the carrier of the cutting tool is entirely automatically fed toward the pipe. Moreover, the members for clamping the pipe are automatically operated, so that the work of skilled workmen is not required for the successful operation of my pipe cutter. The latter is very simple in construction and, therefore, can be easily repaired, if any part should become damaged.

In the drawing, in which I have shown a preferred construction of my new pipe cutter, Figure 1 is a front view thereof, Fig. 2 a side view, Fig. 3 a rear view, showing the two parts of the cutter separated for the purpose of enabling the cutter to be placed around the pipe, Fig. 4 a section along A—A in Fig. 1 on an enlarged scale showing also the tool carrier; Fig. 5 a section along B—B in Fig. 1 on a still larger scale. Fig. 6 illustrates the manner of using my pipe cutter in connection with pipes placed in a trench or excavation, while Fig. 7 is a side view of the cutting tool and its carrier, Fig. 8 is a section along 1—1 in Fig. 1. Fig. 9 illustrates the pawl, its shape and mounting.

My improved pipe cutter consists of an annular holder made of two parts so as to permit the cutter to be easily placed on any part of a pipe conduit without the necessity of taking the conduit apart. The annular holder comprises the bearing ring $a$ and two co-axial annular slides $b$, $c$, which are movably arranged within grooves in the side of the annular holder $a$ the groove receiving the slide $b$ being formed in an annular part $a'$. The holder carries clamping members $d$ for firmly securing the holder on the pipe to be cut. On the holder is also provided a casing $e$, having a prismatic groove, in which a slide $f$ can be adjusted back and forth, which slide can be secured in its adjusted position by screws $w$ and is, in turn, provided with a prismatic groove for the guidance of the tool carrier $v$. The latter, which carries the cutting tool $g$ is provided with threads along a portion of its inner face.

For moving the annular slide $b$, which carries the casing $e$ around the pipe to be cut teeth $h$ are formed on the inner face of the slide $b$, which teeth are in mesh with a gear-wheel secured to a rotatable spindle $i$ (Fig. 4). Upon the rotation of said spindle, by means of a crank not shown, the slide $b$ is moved in a circular path, whereby the casing $e$ and therefore the cutting tool $g$ held therein are moved around the pipe to be cut. For the purpose of automatically feeding, during this circular movement, the cutting tool $g$, toward the pipe, a worm-wheel $l$ is mounted on the casing $e$ in such a way as to mesh with the threads provided on the inner face of the tool carrier $v$. Rigidly connected with the worm-wheel $l$ is a ratchet wheel $n$. After each complete revolution of the cutting tool around the pipe to be cut, this ratchet-wheel $n$ comes in contact with a pawl $o$ (Figs. 1, 6 and 9), yieldingly mounted on the annular holder $a$, and being subjected to the action of a spring $o'$ shown in dotted lines in Fig. 9. In this way, the ratchet wheel $n$ is given, at the end of each complete revolution of the tool carrier $v$ around the pipe a partial rotation, whereby the cutting tool $g$ is fed toward the pipe. If no feeding of the cutting tool is desired, the pawl $o$ is removed out of the path of the ratchet wheel $n$ and is locked in position by a locking member $o^2$, or the like. The ratchet wheel $n$ can also be rotated by hand, to which end its axis is provided at its outer end with a square, on which a key may be placed.

The annular slide $c$ which is used for adjusting the clamp members $d$ relative to the pipe to be cut, is provided with wide helical threads $c'$ (Fig. 4), adapted to mesh with teeth formed on the inner faces of the clamping members $d$. Consequently when the annular slide $c$ is turned by means of the handles $q$, in one or the other direction, the clamping members $d$ are forced either away from, or toward, the pipe to be cut, in which latter case they firmly grip the pipe, holding it in central position. Inside the clamping members *d* special bearing screws *s* are provided, which can be adjusted by means of a spanner *r* (Fig. 1), independently of each other, in such a way that the pipe can be clamped in place merely by turning said screws. For the insertion of the handles *q* (Fig. 4) the annular slide *c* is provided along its outer side with a number of bushings *p*.

In order to prevent any relative displacement of the two parts *a* of the holder at the joints *z*, dowel pins *t* are provided on the end faces of one of the parts *a*, which dowel pins enter corresponding holes provided at the ends of the other part *a* of the holder. Small screws *u* are, moreover, carried by one part of the holder *a*, which screws are arranged at right angles to the dowel pins *t* and are adapted to engage recesses therein to hold the dowel pins immovably in their holes.

Before placing my new cutter around the pipe to be cut, as shown in Fig. 6, I loosen the screws *u* and separate the two parts *a* of the holder, as shown in Fig. 3. Then the parts can be easily placed around the pipe, as shown in Fig. 6. After the two parts have been fitted together, the screws *u* are again tightened, whereby the two parts of the holder are immovably connected. The clamping members *d* are then moved against the pipe, *x*, by a turn of the annular slide *c*. When the pipe is firmly gripped by the bearing screws *s*, provided within the clamping members, the cutting tool *g* is moved around the pipe in the manner already described. At the end of each complete revolution of the tool *g* it is automatically fed toward the pipe through the engagement of the ratchet wheel *n* with the pawl *o*, as above set forth.

I claim as my invention:—

1. A pipe cutter comprising an annular holder composed of two substantially semi-annular halves, a tool carrying slide also composed of two substantially semi-annular halves, each half being rotatably mounted in a half of said holder on one side thereof, a second slide likewise composed of two substantially semi-annular halves, each half being rotatably mounted in a half of the holder, but on the opposite side thereof, clamping members, provided on said holder, and means for independently moving the two slides relative to the holder.

2. A pipe cutter comprising an annular holder composed of two halves, a tool-carrying slide also composed of two halves, a second slide likewise composed of two halves, both slides being rotatably mounted in said holder on opposite sides thereof, clamping members arranged on said holder, means for independently moving the two slides, and a yielding pawl provided on said holder and a ratchet wheel for feeding the tool, so arranged as to be turned one step for each revolution of said tool carrying slide.

3. In a pipe cutter an annular holder composed of two separate parts, each part comprising a semi-annular holder and two semi-annular slides co-axial therewith and movably mounted thereon, means for independently moving said slides relative to said holder, a casing carried by one of said slides, a tool carrier movably arranged in said casing, means independent of said casing for feeding said tool carrier toward the work, a ratchet wheel connected with said feeding means, and a pawl arranged on said holder and adapted to rotate said ratchet wheel after each complete revolution of said slide, and means for normally holding said pawl in operative position and permitting the pawl to be removed out of operative position at will.

In testimony whereof I have affixed my signature in presence of two witnesses.

OTTO WAGNER.

Witnesses:
 MAX WÄMPEL,
 BERNHARD MÜLLER.